(12) United States Patent
Choi et al.

(10) Patent No.: US 8,029,264 B2
(45) Date of Patent: Oct. 4, 2011

(54) INJECTION MOLDING MACHINE

(75) Inventors: Duck Su Choi, Suwon-si (KR); Shang Han Lee, Seoul (KR); Han Moog Kang, Seoul (KR); Jae Hyung Kim, Anyang-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 287 days.

(21) Appl. No.: 12/412,423

(22) Filed: Mar. 27, 2009

(65) Prior Publication Data

US 2009/0252826 A1  Oct. 8, 2009

(30) Foreign Application Priority Data

Apr. 4, 2008 (KR) .................. 10-2008-0031791

(51) Int. Cl.
*B29C 45/22* (2006.01)

(52) U.S. Cl. ......... 425/130; 264/255; 425/185; 425/572

(58) Field of Classification Search .................. 425/185, 425/190, 130, 572; 264/255
See application file for complete search history.

(56) References Cited

U.S. PATENT DOCUMENTS

| | | | | |
|---|---|---|---|---|
| 4,734,023 A | * | 3/1988 | Nesch et al. | 425/130 |
| 5,662,946 A | * | 9/1997 | Pratt et al. | 425/190 |
| 5,869,111 A | * | 2/1999 | Takahashi et al. | 425/589 |
| 5,882,695 A | * | 3/1999 | Starkey | 425/168 |
| 2006/0244178 A1 | * | 11/2006 | Armbruster | 264/255 |

FOREIGN PATENT DOCUMENTS

| | | |
|---|---|---|
| DE | 202006005902.4 | 8/2007 |
| JP | 61231724 | 10/1986 |
| JP | 09011241 | 1/1997 |
| JP | 10235651 | 9/1998 |
| JP | 11179759 | 7/1999 |
| KR | 929161 | 6/1992 |
| KR | 1999-0020317 | 6/1999 |
| KR | 19990020316 | 6/1999 |
| KR | 200236418 | 6/2001 |

OTHER PUBLICATIONS

European Search Report issued Aug. 6, 2009 in EP Application No. 09155840.3.

* cited by examiner

*Primary Examiner* — Timothy Heitbrink
(74) *Attorney, Agent, or Firm* — Stanzione & Kim, LLP

(57) ABSTRACT

An injection molding machine includes supporting plates, molds coupled to the supporting plates, and a coupling guide device to guide the coupling of the molds and the supporting plates. The coupling guide device includes a first coupling guide recess and a first coupling guide protrusion provided at center portions of the molds and the supporting plates so as to be coupled to each other, and a second coupling guide recess and a second coupling guide protrusion provided at the molds and the supporting plates, spaced apart from the first coupling guide recess and the first coupling guide protrusion, so as to be coupled to each other. The second coupling guide recess is formed lengthwise in a direction toward a periphery from the center portions of the molds and the supporting plates.

26 Claims, 13 Drawing Sheets

INJECTION MOLDING MACHINE

CROSS-REFERENCE TO RELATED APPLICATIONS

This application claims priority under 35 U.S.C. §119(a) from Korean Patent Application No. 2008-0031791, filed on Apr. 4, 2008 in the Korean Intellectual Property Office, the disclosure of which is incorporated herein in its entirety by reference.

BACKGROUND OF THE INVENTION

1. Field of the Invention

The present general inventive concept relates to an injection molding machine, and more particularly, to an injection molding machine having a guide device to guide coupling of molds and supporting plates and assembling of the molds.

2. Description of the Related Art

An injection molding machine is a machine that produces a molded product by injecting molten resin into a cavity defined by molds at a high pressure and solidifying the resin.

An injection molding machine generally includes molds to define a cavity, supporting plates to support the molds, and a high pressure cylinder to inject molten resin into the cavity. At least one of the supporting plates is moved to achieve coupling or separation of the molds.

When producing a molded product of a different size or shape by use of an injection molding machine, the molds mounted to the supporting plates can be replaced. The replacement of the molds is realized in such a manner that the existing molds are removed from the supporting plates and then new molds are mounted to the supporting plates. At this time, because the molds are so heavy, a crane or the like is used for the replacement work. A plurality of bolts are tightened to securely fix the molds to the supporting plates. Such a work is identically applied also when the molds are to be partially modified or repaired.

However, in the above conventional injection molding machine, because moving the heavy molds is difficult, aligning centers of the molds with centers of the supporting plates when the molds are mounted to the supporting plates is difficult. Also, because the centers of the molds may deviate from the centers of the supporting plates in the process of tightening the bolts, mounting the molds to correct positions is difficult. Also, if the molds are thermally deformed, assembling errors may be generated in the mold mounting process. The assembling errors of the molds may cause a problem of misalignment of the centers of the molds assembled with each other, and as a result may create defects of molded products.

SUMMARY OF THE INVENTION

The present general inventive concept provides an injection molding machine to minimize defects of molded products by accurately aligning centers of molds assembled with each other.

The present general inventive concept also provides an injection molding machine to mount molds to correct positions when the molds are coupled to supporting plates, and of accurately keeping the coupling positions even when the molds are thermally deformed.

Additional aspects and/or utilities of the present general inventive concept will be set forth in part in the description which follows and, in part, will be obvious from the description, or may be learned by practice of the general inventive concept.

The foregoing and/or other aspects and utilities of the general inventive concept may be achieved by providing an injection molding machine including supporting plates, molds coupled to the supporting plates, and a coupling guide device to guide the coupling of the molds and the supporting plates, the coupling guide device including a first coupling guide recess and a first coupling guide protrusion provided at center portions of the molds and the supporting plates so as to be coupled to each other, and a second coupling guide recess and a second coupling guide protrusion provided at the molds and the supporting plates, spaced apart from the first coupling guide recess and the first coupling guide protrusion, so as to be coupled to each other. The second coupling guide recess is formed lengthwise in a direction toward a periphery from the center portions of the molds and the supporting plates.

The second coupling guide recess and the second coupling guide protrusion may have a T-shaped section.

The foregoing and/or other aspects and utilities of the general inventive concept may also be achieved by providing an injection molding machine including two molds assembled with each other to form molding spaces, and a center guide device to guide the molds so that centers of the molds coincide with each other when the molds are assembled with each other, the center guide device including a center guide recess formed at the center of one of the two molds, and a center guide protrusion provided at the center of the other one of the two molds.

The center guide recess may have a tapered inner surface to guide insertion of the center guide protrusion, and the center guide protrusion may have a tapered outer surface having a shape corresponding to the tapered inner surface of the center guide recess.

The center guide device may include a first guide plate and a second guide plate respectively removably coupled to the centers of the two molds. The center guide recess may be formed at the first guide plate, and the center guide protrusion may be provided at the second guide plate.

The center guide recess may be formed at one of the two molds, which has a relatively high temperature, and the center guide protrusion may be provided at the other one of the two molds, which has a relatively low temperature.

The foregoing and/or other aspects and utilities of the general inventive concept may also be achieved by providing an injection molding machine including a fixed supporting plate, a movable supporting plate spaced apart from the fixed supporting plate, a rotatable supporting plate rotatably and movably provided between the fixed supporting plate and the movable supporting plate, a fixed mold coupled to the fixed supporting plate, a movable mold coupled to the movable supporting plate, two rotatable molds respectively coupled to both surfaces of the rotatable supporting plate, the two rotatable molds being united with the movable mold to form a first molding space or being united with the fixed mold to form a second molding space, and a coupling guide device to guide the coupling of the two rotatable molds and the rotatable supporting plate, the coupling guide device including a first coupling guide recess and a first coupling guide protrusion respectively provided at center portions of the two rotatable molds and both the surfaces of the rotatable supporting plate so as to be coupled to each other, and a second coupling guide recess and a second coupling guide protrusion respectively provided at the two rotatable molds and both the surfaces of the rotatable supporting plate, spaced apart from the first coupling guide recess and the first coupling guide protrusion, so as to be coupled to each other. The second coupling guide recess is formed lengthwise in a direction toward a periphery from the center portions of the two rotatable molds and the rotatable supporting plate.

The injection molding machine may further include a center guide device to guide the fixed mold, the two rotatable molds and the movable mold so that the fixed mold can be united with the two rotatable molds and the movable mold can be united with the two rotatable molds while centers thereof coincide with each other. The center guide device may include a center guide recess formed at the center of one of two molds opposing each other, and a center guide protrusion provided at the center of the other one of the two molds opposing each other, so as to be fitted into the center guide recess.

The injection molding machine may further include a plurality of runner members mounted in the fixed mold and the movable mold to form paths for molten resin supplied to the first molding space and the second molding space. Each of the plurality of runner members may include a multi-stepped injection guide pipe having an inner diameter and an outer diameter which are gradually decreased as they go to a gate, and a pin mounted in the injection guide pipe so as to be moved back and forth to open or close the gate.

The injection guide pipe may include at least two pipes which have inner and outer diameters different from each other and are removably connected in series to each other.

The foregoing and/or other aspects and utilities of the general inventive concept may also be achieved by providing an injection molding machine including a fixed supporting plate, a movable supporting plate spaced apart from the fixed supporting plate, a rotatable supporting plate rotatably and movably provided between the fixed supporting plate and the movable supporting plate, a fixed mold coupled to the fixed supporting plate, a movable mold coupled to the movable supporting plate, two rotatable molds respectively coupled to both surfaces of the rotatable supporting plate, the two rotatable molds being united with the movable mold to form a first molding space or being united with the fixed mold to form a second molding space, and a center guide device to guide the fixed mold, the two rotatable molds and the movable mold so that the fixed mold can be united with the two rotatable molds and the movable mold can be united with the two rotatable molds while centers thereof coincide with each other. The center guide device includes a center guide recess formed at the center of one of two molds opposing each other, and a center guide protrusion provided at the center of the other one of the two molds opposing each other, so as to be fitted into the center guide recess.

The foregoing and/or other aspects and utilities of the general inventive concept may also be achieved by providing an injection molding machine including a rotatable supporting plate having two surfaces, a fixed mold, and a movable mold, a plurality of rotatable molds respectively coupled to the two surfaces of the rotatable supporting plate to unite with at least one of the movable mold and the fixed mold, and a center guide device to guide the fixed mold, the plurality of rotatable molds and the movable mold, wherein the fixed mold units with the plurality of rotatable molds and the movable mold unites with the plurality of rotatable molds with centers thereof aligning with each other.

BRIEF DESCRIPTION OF THE DRAWINGS

These and/or other aspects and utilities of the exemplary embodiments of the general inventive concept will become apparent and more readily appreciated from the following description of the embodiments, taken in conjunction with the accompanying drawings, of which.

DETAILED DESCRIPTION OF THE PREFERRED EMBODIMENTS

Figure 1:
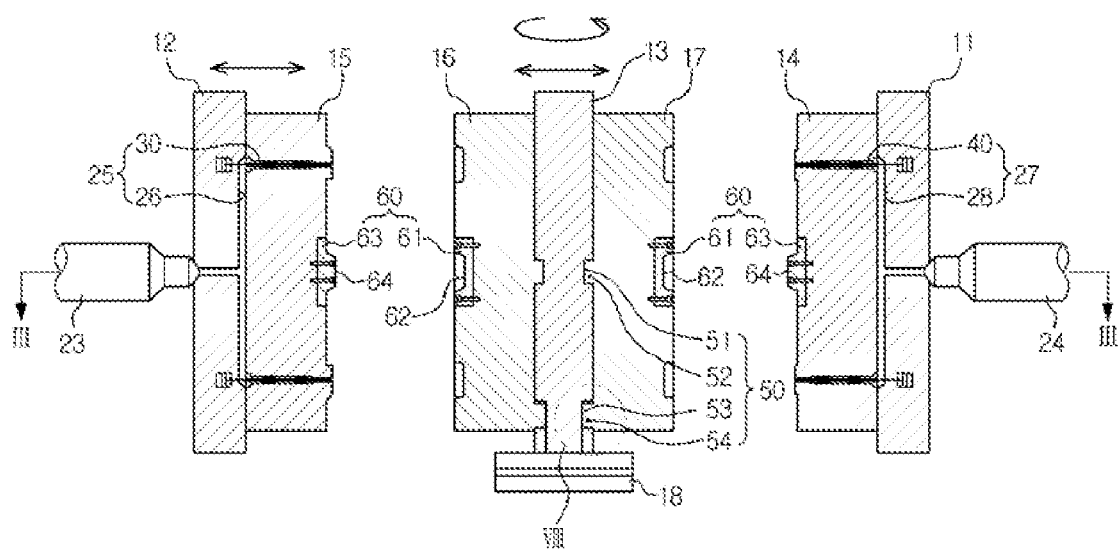
FIG. 1 is a sectional view illustrating a disassembled state of molds of an injection molding machine according to an embodiment of the present general inventive concept.

Reference will now be made in detail to exemplary embodiments of the present general inventive concept, examples of which are illustrated in the accompanying drawings, wherein like reference numerals refer to like elements throughout. The embodiments are described below to explain the present general inventive concept by referring to the figures.

Figure 6:
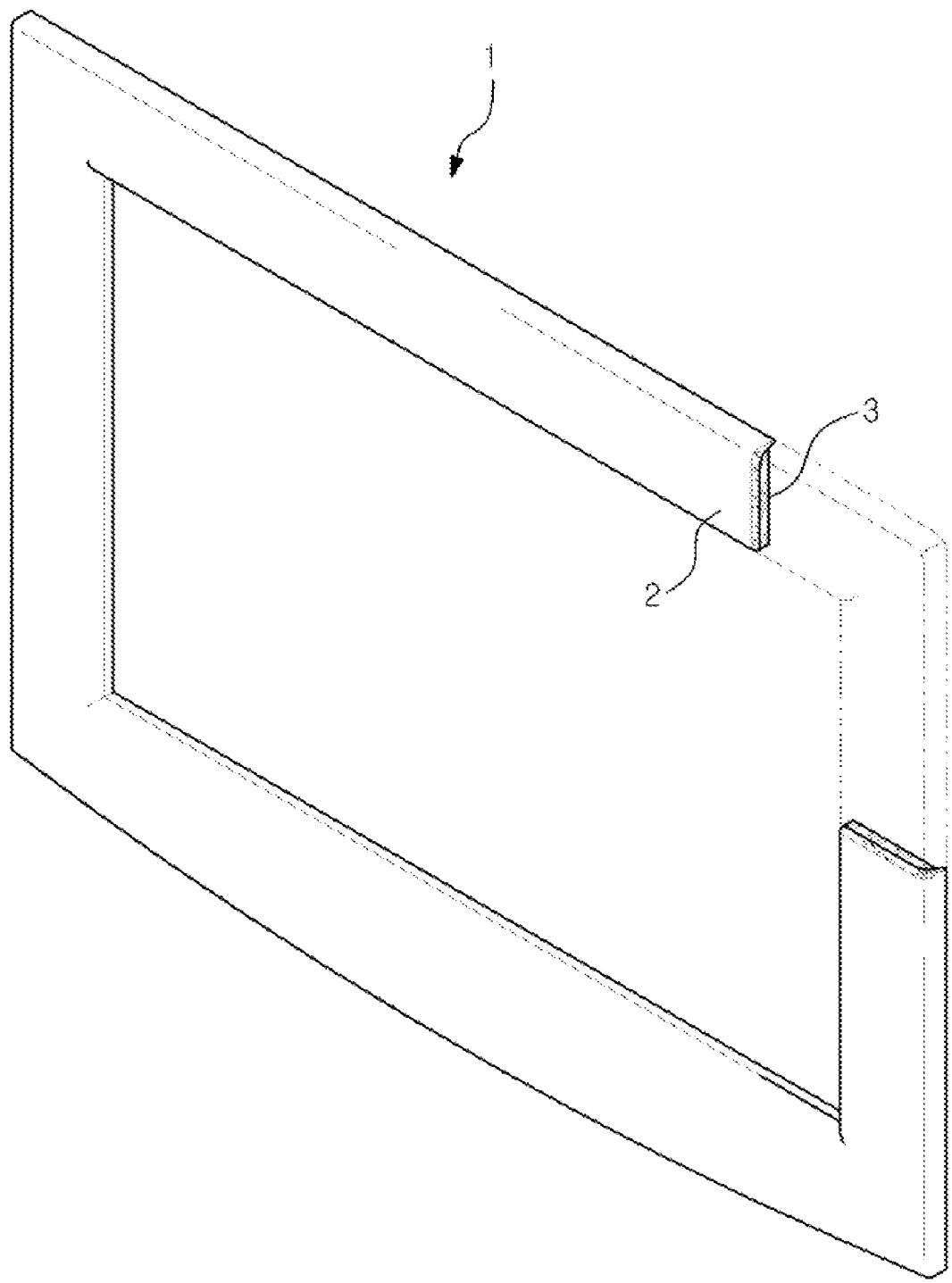
FIG. 6 is a perspective view illustrating a molded product produced by an injection molding machine according to an embodiment of the present general inventive concept.

An injection molding machine according to an embodiment of the present general inventive concept, as illustrated in FIG. 6, can produce a double molded product 1 which includes a transparent layer 2 and a colored layer 3. The double molded product 1 illustrated in FIG. 6 is used for a front case of a display apparatus (e.g., TV, monitor or the like) or a cellular phone, and has an opened center portion so as to expose a screen. However, a molded product produced by the injection molding machine according to an embodiment of the present general inventive concept is not limited to the above-described shape.

Figure 2:
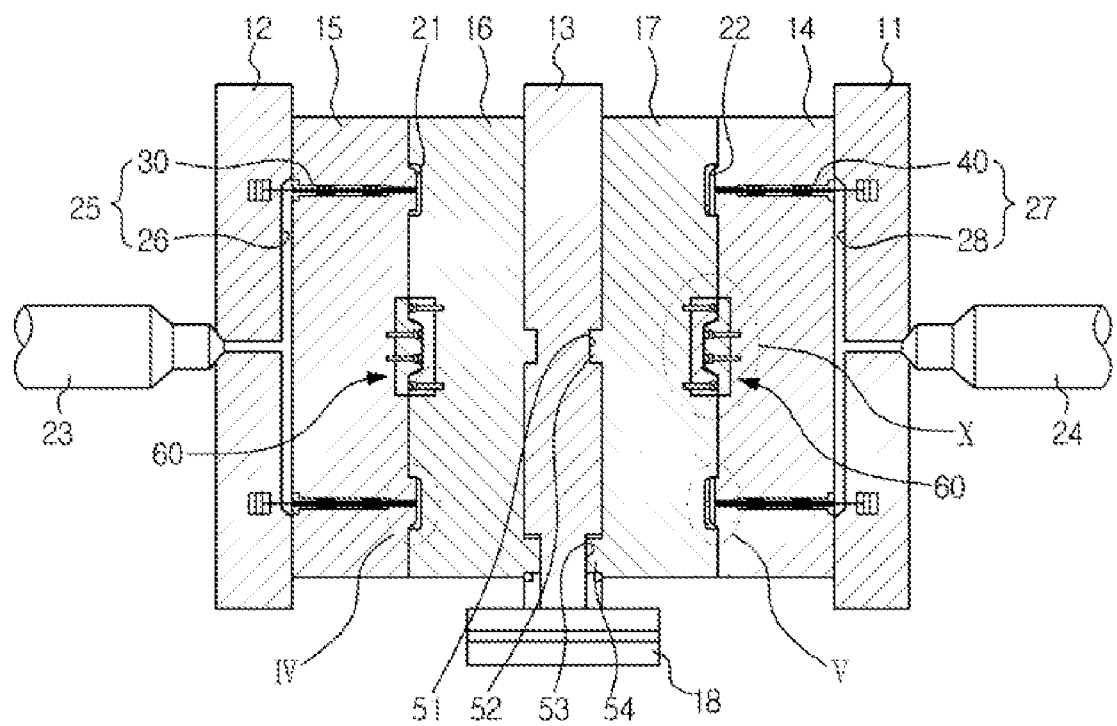
FIG. 2 is a sectional view illustrating an assembled state of the molds of the injection molding machine illustrated in FIG. 1.
Figure 3:
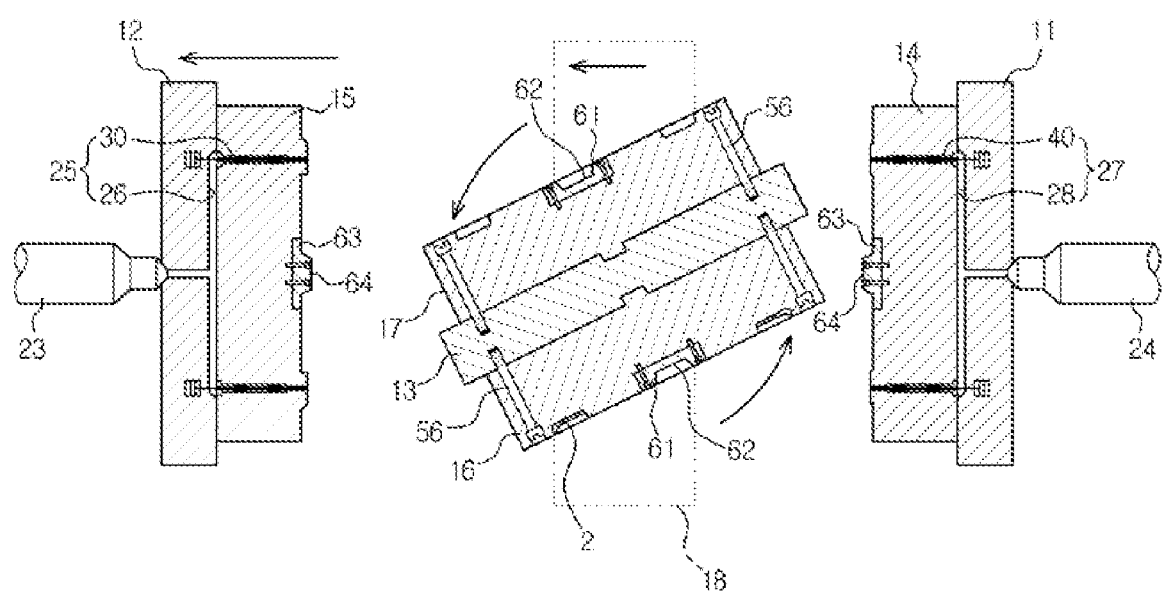
FIG. 3 is a sectional view taken along line III-III' in FIG. 1, which illustrates a rotating state of first and second rotatable molds.

As illustrated in FIGS. 1 to 3, the injection molding machine adapted to produce the double molded product 1 includes a fixed supporting plate 11, a movable supporting plate 12 spaced apart from the fixed supporting plate 11, a rotatable supporting plate 13 provided between the fixed supporting plate 11 and the movable supporting plate 12, a fixed mold 14 mounted to the fixed supporting plate 11, a movable mold 15 mounted to the movable supporting plate 12, and a first rotatable mold 16 and a second rotatable mold 17 respectively mounted to both surfaces of the rotatable supporting plate 13.

Although not illustrated in the drawings, the movable supporting plate 12 and the rotatable supporting plate 13 are supported by a movement guide device, such as a rail or a guide bar, so as to be moved toward or away from the fixed supporting plate 11 to assemble or separate the molds 14, 15, 16 and 17. A lower end portion of the rotatable supporting plate 13 is supported by a rotating device 18, and thus the rotatable supporting plate 13 can be rotated so that a position of the first rotatable mold 16 and a position of the second rotatable mold 17 are exchanged.

As illustrated in FIG. 2, an assembling of the movable mold 15 and the first rotatable mold 16 or the assembling of the movable mold 15 and the second rotatable mold 17 forms a first molding space 21 in which the transparent layer 2 of the double molded product 1 illustrated in FIG. 6 is molded. The assembling of the first rotatable mold 16 and the fixed mold 14 or the assembling of the second rotatable mold 17 and the fixed mold 14 forms a second molding space 22 in which the colored layer 3 (FIG. 6) of the double molded product 1 illustrated in FIG. 6 is molded.

The first rotatable mold 16 and the second rotatable mold 17 substantially have the same shape. Therefore, the positions of the first and second rotatable molds 16 and 17 are exchanged by rotation of the rotatable supporting plate 13, and the first and second rotatable molds 16 and 17 can be selectively coupled to the fixed mold 14 or the movable mold 15, thereby forming the first molding space 21 or the second molding space 22. This is because the first rotatable mold 16 and the second rotatable mold 17 have the same shape, but the fixed mold 14 and the movable mold 15 have shapes different from each other.

As illustrated in FIG. 2, the movable supporting plate 12 is mounted with a first injection cylinder 23 to supply molten resin (transparent resin) to the first molding space 21, and the movable supporting plate 12 and the movable mold 15 are formed with a first injection passage 25 to guide the molten resin supplied from the first injection cylinder 23 to the first molding space 21. The first injection passage 25 includes first dispersed injection channels 26 formed in the movable supporting plate 12, and a plurality of first runner members 30 mounted in the movable mold 15 so as to be connected with the first dispersed injection channels 26. The first injection cylinder 23 is moved together with the movable supporting plate 12 when the movable supporting plate 12 is moved.

The fixed supporting plate 11 is mounted with a second injection cylinder 24 to supply molten resin (colored resin) to the second molding space 22, and the fixed supporting plate 11 and the fixed mold 14 are formed with a second injection passage 27 to guide the molten resin supplied from the second injection cylinder 24 to the second molding space 22. The second injection passage 27 includes second dispersed injection channels 28 formed in the fixed supporting plate 11, and a plurality of second runner members 40 mounted in the fixed mold 14 so as to be connected with the second dispersed injection channels 28.

In such an injection molding machine, as illustrated in FIG. 1, when the rotatable supporting plate 13 and the movable supporting plate 12 are moved away from the fixed supporting plate 11, the second rotatable mold 17 is separated from the fixed mold 14, and the movable mold 15 is separated from the first rotatable mold 16. Alternatively, as illustrated in FIG. 2, when the rotatable supporting plate 13 and the movable supporting plate 12 are moved toward the fixed supporting plate 11, the molds 14, 15, 16 and 17 can be assembled all together. At this time, the first molding space 21 is formed by the movable mold 15 and the first rotatable mold 16, and the second molding space 22 is formed by the second rotatable mold 17 and the fixed mold 14.

Figure 4:
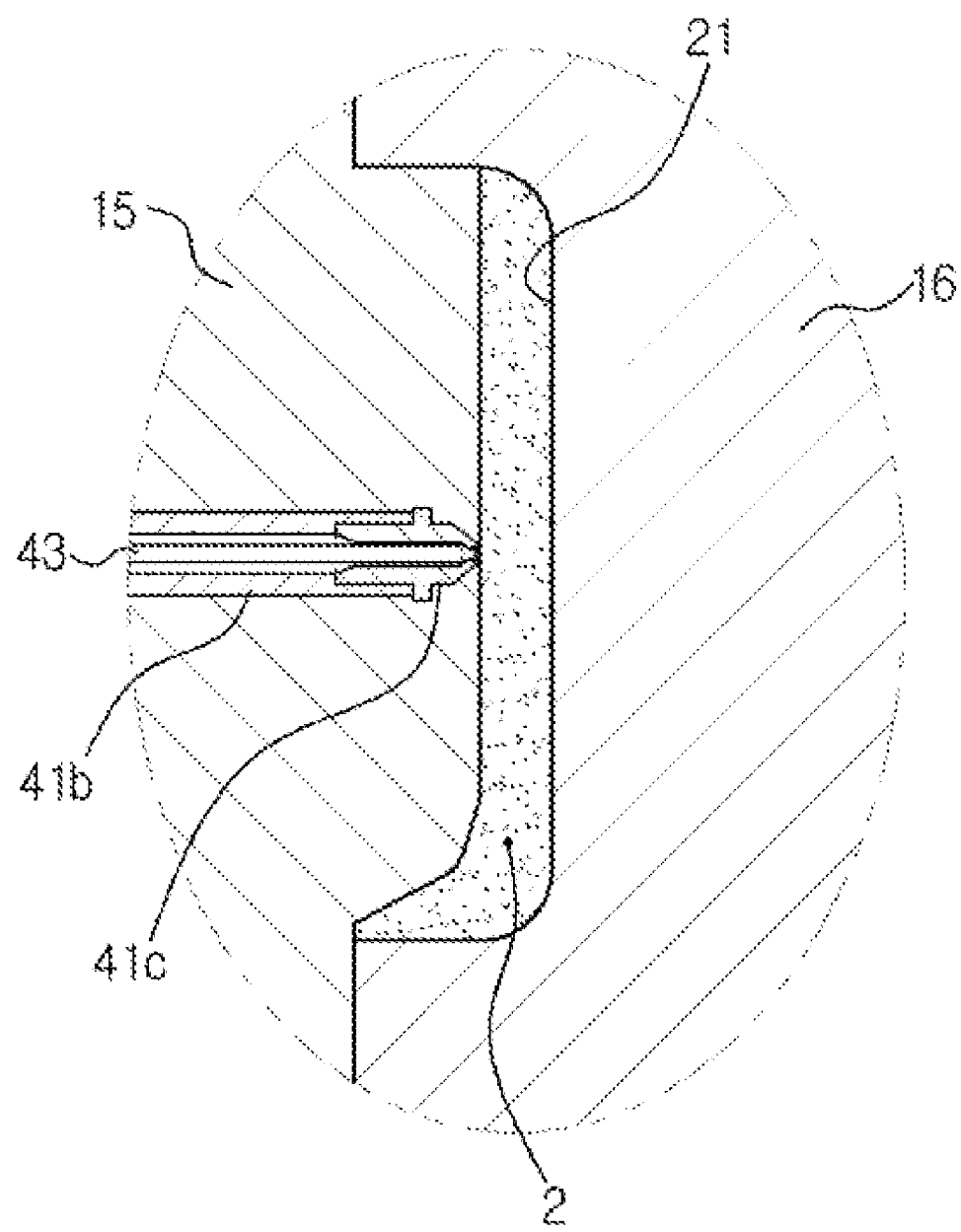
FIG. 4 is a detail view illustrating a IV portion in FIG. 2.
Figure 5:
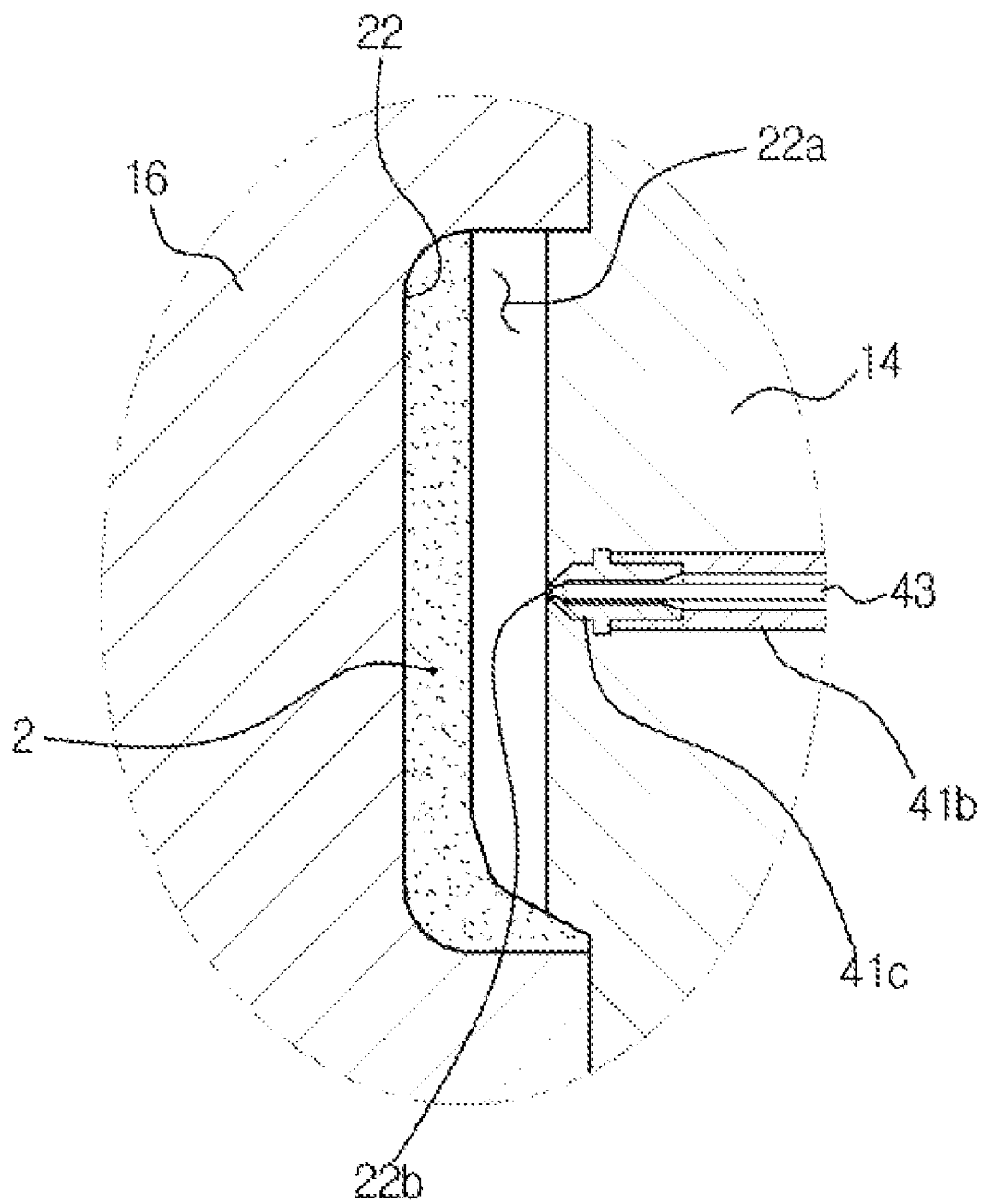
FIG. 5 is a detail view illustrating a V portion in FIG. 2.

If molten resin (transparent resin) is injected into the first molding space 21 in a state illustrated in FIG. 2, the transparent layer 2 of the double molded product 1 (FIG. 3) is formed, as illustrated in FIG. 4. After the transparent layer 2 is formed, the molds are separated from each other. Referring to FIGS. 2 and 3, the rotatable supporting plate 13 is rotated at 180 degrees, so that the positions of the first rotatable mold 16 and the second rotatable mold 17 are exchanged. The transparent layer 2 formed in the first molding space 21 is moved to the second molding space 22 while being positioned inside the first rotatable mold 16. Referring to FIGS. 5 and 6, if the molds are all assembled again, as illustrated in FIG. 5, a space 22*a* to form the colored layer 3 is provided in the second molding space 22 while the transparent layer 2 is positioned in the second molding space 22. By injecting molten resin (colored resin) into the space 22*a*, the double molded product 1, in which the transparent layer 2 and the colored layer 3 are united, is produced.

As illustrated in FIG. 2, after the molds are all assembled, the molding operation (injection of molten resin) with respect to the first molding space 21 and the second molding space 22 are simultaneously performed. After the molds are separated from each other, the double molded product 1 (FIG. 6) formed in the second molding space 22 is drawn out. As illustrated in FIG. 3, the first and second rotatable molds 16 and 17 are rotated so that the positions thereof are exchanged. The transparent layer 2 formed in the first molding space 21 is rotated while being positioned inside the first or second rotatable mold 16 or 17, and is moved to the second molding space 22. The injection molding machine can successively produce the double molded product 1 illustrated in FIG. 6, through a repetition of the above processes.

When a molded product of a different size or shape is to be produced, the fixed mold 14, the movable mold 15 and the first and second rotatable molds 16 and 17 can be replaced by other molds. After the existing molds are separated from the supporting plates 11, 12 and 13, new molds are mounted to the supporting plates. When the molds are mounted, the centers of the molds should be aligned with each other so that the molds can be accurately assembled. Specifically, because the first rotatable mold 16 and the second rotatable mold 17 respectively mounted to both the surfaces of the rotatable supporting plate 13 are coupled to the movable mold 15 and the fixed mold 14 by turns and have a large movement range due to rotation, more precisely mounting the first rotatable mold 16 and the second rotatable mold 17 is required. In this regard, a coupling guide device 50 is provided at both the surfaces of the rotatable supporting plate 13, the first rotatable mold 16 and the second rotatable mold 17, so as to guide the correct coupling of the molds and the supporting plates.

Figure 7:
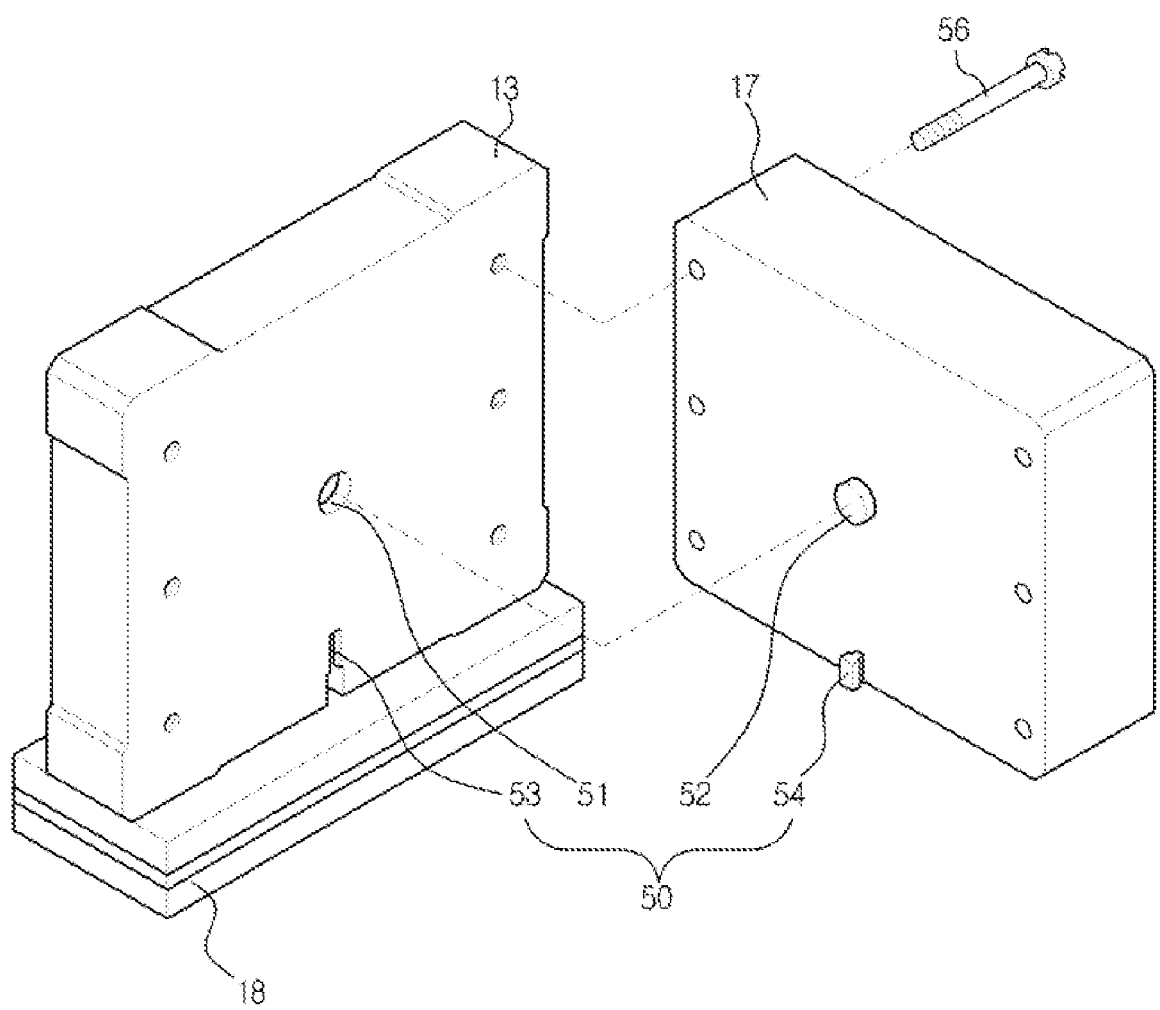
FIG. 7 is a perspective view illustrating a coupling guide device of the injection molding machine according to an embodiment of the present general inventive concept.

As illustrated in FIG. 7, the coupling guide device 50 includes first coupling guide recesses 51 which are respectively formed at substantial center portions of both the surfaces of the rotatable supporting plate 13, first coupling guide protrusions 52 which are respectively protruded from substantial center portions of the first and second rotatable molds 16 and 17 so as to be fitted into the first coupling guide recesses 51, second coupling guide recesses 53 which are respectively formed at both the surfaces of the rotatable supporting plate 13, spaced apart from the first coupling guide recesses 51, and second coupling guide protrusions 54 which are respectively formed at the first and second rotatable molds 16 (FIG. 2) and 17 so as to be fitted into the second coupling guide recesses 53. The forming positions of the first coupling guide recesses 51 and the forming positions of the first coupling guide protrusions 52 may be exchanged. Similarly, the forming positions of the second coupling guide recesses 53 and the forming positions of the second coupling guide protrusions 54 may be exchanged.

The coupling guide device 50 serves to accurately couple the rotatable supporting plate 13 and the first and second rotatable molds 16 and 17 in such a manner that the first coupling guide recesses 51 and the first coupling guide protrusions 52 guide the coupling of center portions of the rotatable supporting plate 13 and the first and second rotatable molds 16 and 17, and the second coupling guide recesses 53 and the second coupling guide protrusions 54 guide the coupling of the lower portions spaced apart from the center portions of the rotatable supporting plate 13 and the first and second rotatable molds 16 and 17. Further, in the coupling process, the second coupling guide protrusions 54 and the second coupling guide recesses 53 prohibit the first and second rotatable molds 16 and 17 from being rotated with respect to the rotatable supporting plate 13. Accordingly, the first and second rotatable molds 16 and 17 can be more accurately coupled to the rotatable supporting plate 13.

Figure 8:
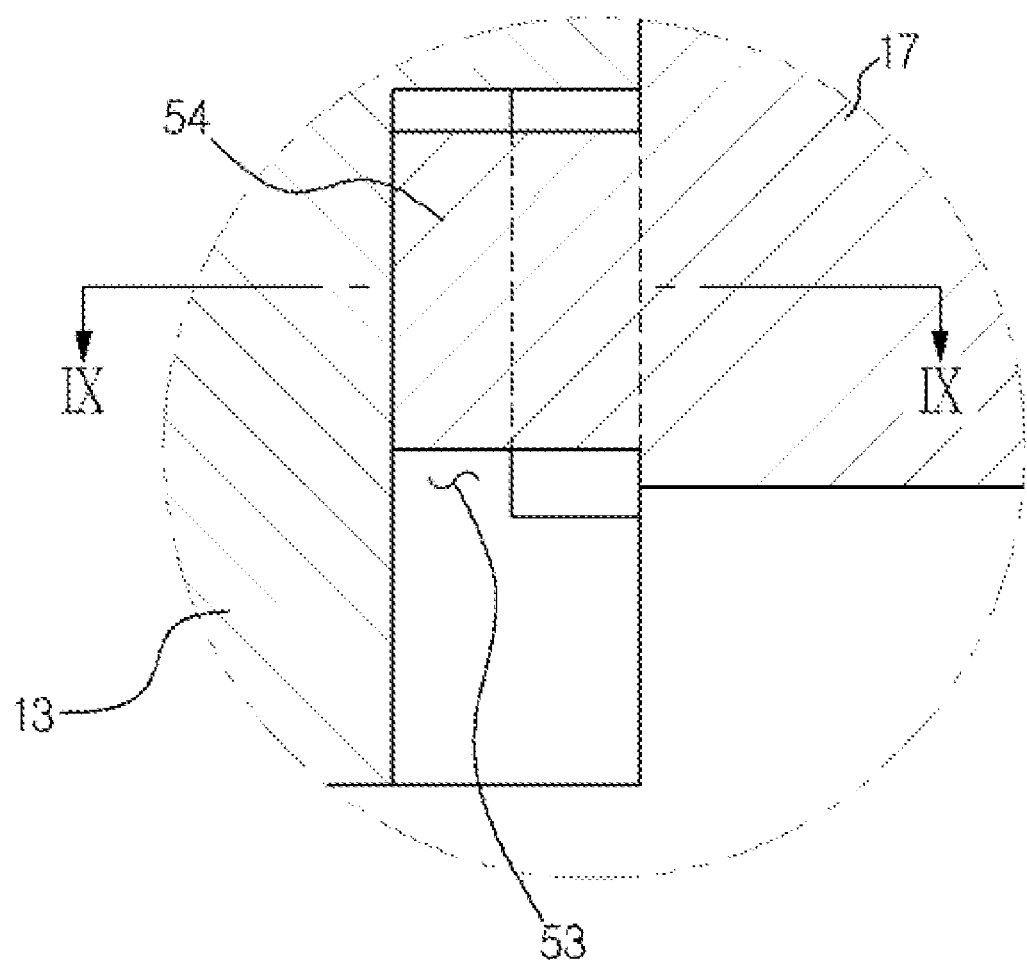
FIG. 8 is a detail view illustrating an VIII portion in FIG. 1.

As illustrated in FIGS. 7 and 8, the second coupling guide recesses 53 are formed lengthwise in a direction toward the periphery from the center portion of the rotatable supporting plate 13. Even when the first and second rotatable molds 16 (FIG. 2) and 17 or the rotatable supporting plate 13 are thermally deformed, the second coupling guide recesses 53 accept the deformation. Therefore, assembling errors can be minimized. Moreover, the above shape of the second coupling guide recesses 53 gets the first and second rotatable molds 16 and 17 deformed equally in all directions from the center portion, thereby minimizing generation of assembling errors even when the thermal deformation occurs.

Figure 9:
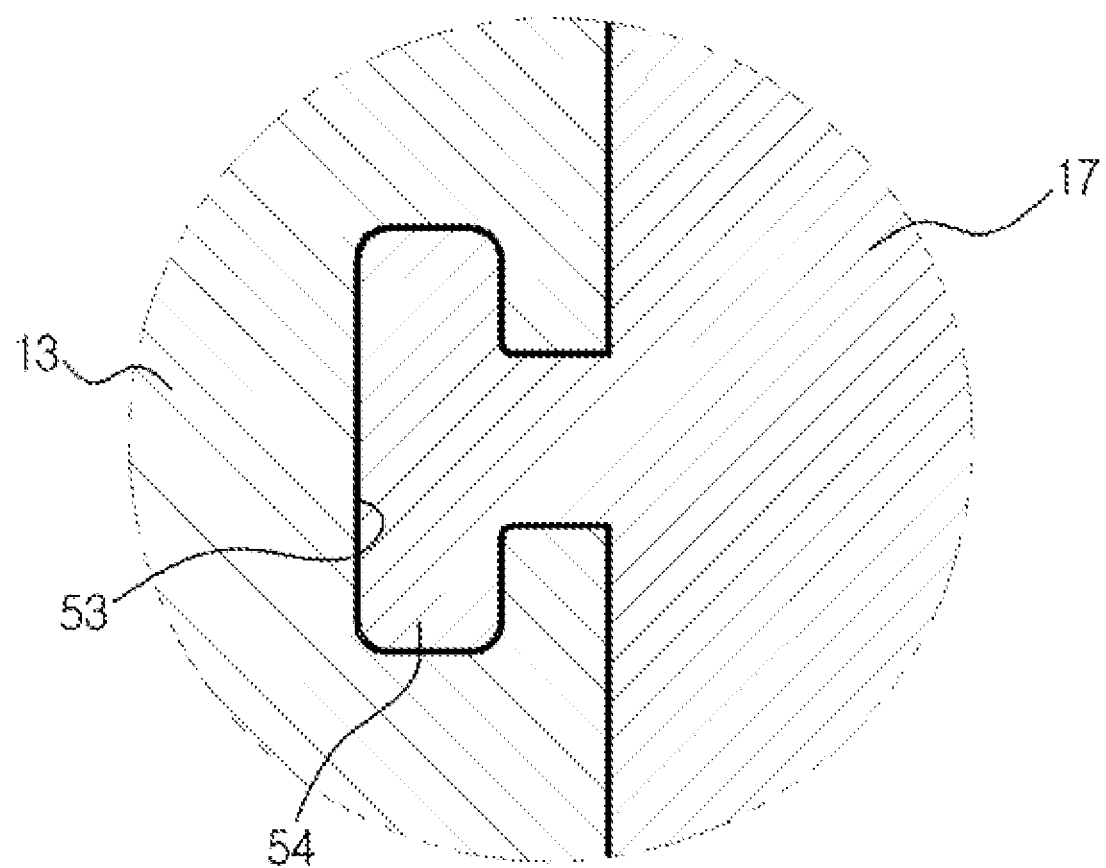
FIG. 9 is a sectional view taken along line IX-IX' in FIG. 8.

As illustrated in FIG. 9, the second coupling guide recesses 53 and the second coupling guide protrusions 54 have T-shaped sections, so as to be caught by each other. The T-shaped second coupling guide protrusions 54 can be moved in a longitudinal direction of the second coupling guide recesses 53 while being caught by the T-shaped second coupling guide recesses 53. Therefore, the second coupling guide recesses 53 and the second coupling guide protrusions 54 can accept the thermal deformation of the first and second rotatable molds 16 and 17 and the rotatable supporting plate 13, and ensures stable coupling of the molds 16 and 17 and the supporting plate 13.

After being coupled preliminarily by the coupling guide device 50, as illustrated in FIG. 7, the first and second rotatable molds 16 (FIG. 6) and 17 and the rotatable supporting plate 13 are securely fixed to each other by tightening a plurality of bolts 56. Since the bolts 56 are tightened after the coupling positions are determined by the coupling guide device 50, assembling errors can be reduced, when compared to a conventional coupling method using only bolts. Accordingly, the centers of the first and second rotatable molds 16 and 17 coincide, that is, align, with the center of the rotatable supporting plate 13. Referring to FIG. 1, as a result, the centers of the movable mold 15 and the fixed mold 14 coincide with the centers of the first and second rotatable molds 16 and 17, thereby minimizing defects of a molded product.

The first and second rotatable molds 16 and 17 have a large movement range, because the first and second rotatable molds 16 and 17 perform a rotating motion to exchange respective positions thereof, as well as a rectilinear motion. Thus, when the first and second rotatable molds 16 and 17 are assembled with the movable mold 15 or the fixed mold 14, guiding the molds 14, 15, 16 and 17 is needed so that the molds 14, 15, 16 and 17 can be accurately assembled with each other. In this regard, the injection molding machine of the present embodiment further includes center guide devices 60 to guide the molds 14, 15, 16 and 17 so that the centers of the molds 14, 15, 16 and 17 accurately coincide with each other when the molds 14, 15, 16 and 17 are assembled.

Figure 10:
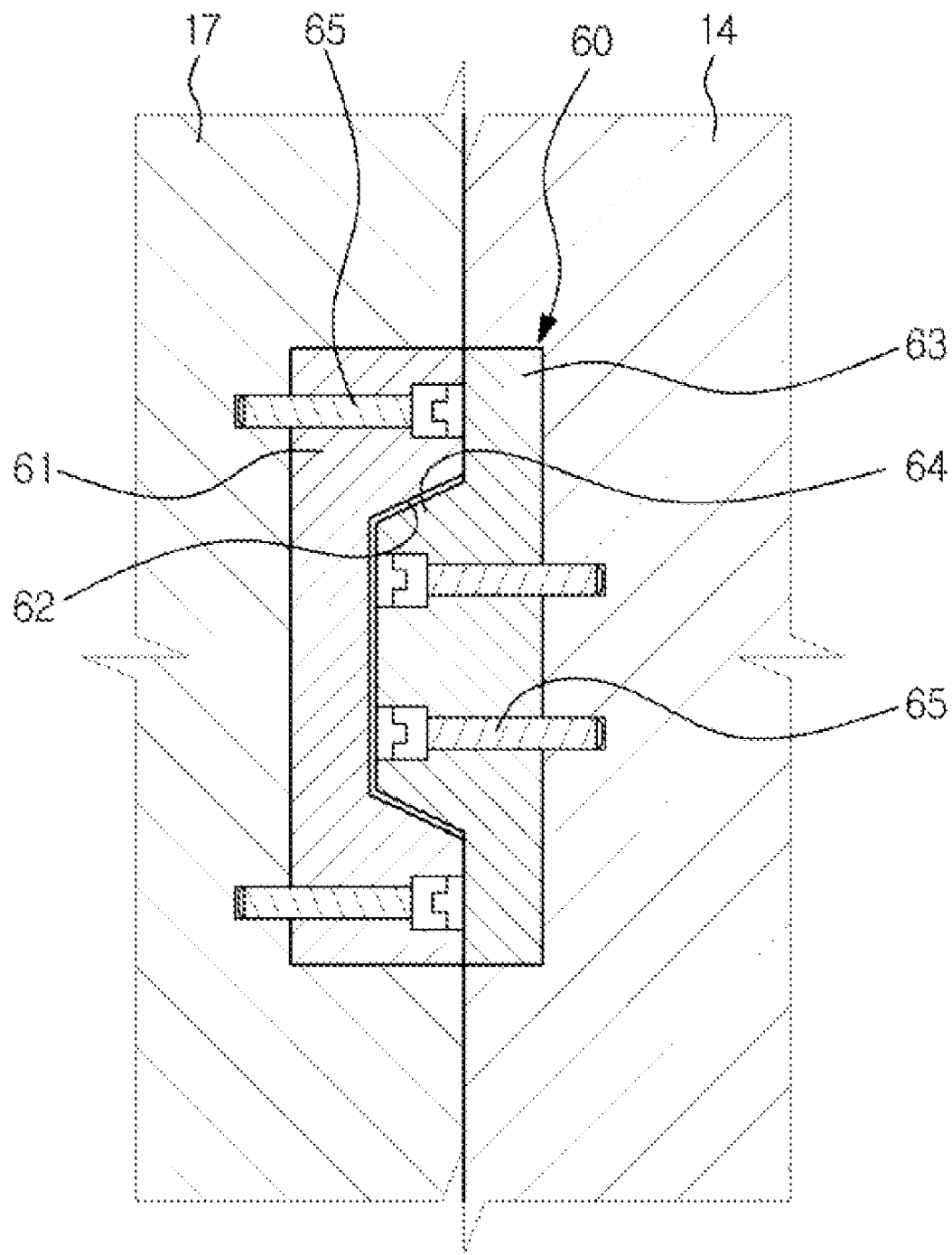
FIG. 10 is a detail view of a X portion in FIG. 2, which illustrates a center guide device of the injection molding machine according to an embodiment of the present general inventive concept.

FIG. 10 is a detail view illustrates a X portion in FIG. 2, which illustrates the center guide device 60 provided at the fixed mold 14 and the second rotatable mold 17. The center guide device 60 includes a first guide plate 61 mounted to the center of the second rotatable mold 17 and having a center guide recess 62, and a second guide plate 63 mounted to the center of the fixed mold 14 and having a center guide protrusion 64 to be fitted into the center guide recess 62. The same center guide device 60 as above is also provided at the movable mold 15 and the first rotatable mold 16.

The center guide recess 62 has a tapered inner surface such that an inner diameter of the center guide recess 62 is gradually decreased as the center guide recess extends inward from an outermost edge of the recess 62, and the center guide protrusion 64 has a tapered outer surface corresponding to the tapered inner surface of the center guide recess 62. When the molds 14 and 17 are assembled with each other, the center guide protrusion 64 is fitted into the center guide recess 62 by being guided by the inner surface of the center guide recess 62. Accordingly, the centers of the molds 14 and 17 coincide with each other, and as a result the molds 14 and 17 can be accurately assembled with each other. Because the first guide plate 61 and the second guide plate 63 are removably coupled to the second rotatable mold 17 and the fixed mold 14 by use of bolts 65, the first guide plate 61 or the second guide plate 63 can be removed and replaced by a new one when the center guide recess 62 or the center guide protrusion 64 is damaged or worn.

In the injection molding machine of this embodiment, the first and second rotatable molds 16 (FIG. 2) and 17 have a temperature higher than the movable mold 15 and the fixed mold 14. Thus, the thermal deformation of the assembled molds 14, 15, 16 and 17 may occur different. In this regard, the center guide recess 62 is formed at the first and second rotatable molds 16 and 17 having a relatively high temperature, and the center guide protrusion 64 is provided at the movable mold 15 and the fixed mold 14 having a relatively low temperature. As such, since the center guide recess 62 is formed at an element of which thermal expansion is large due to a relatively high temperature, even when the thermal deformation occurs, the molds can be smoothly assembled with each other. If the movable mold 15 and the fixed mold 14 have a temperature higher than the first and second rotatable molds 16 and 17, the forming position of the center guide recess 62 and the forming position of the center guide protrusion 64 may be exchanged.

Figure 11:
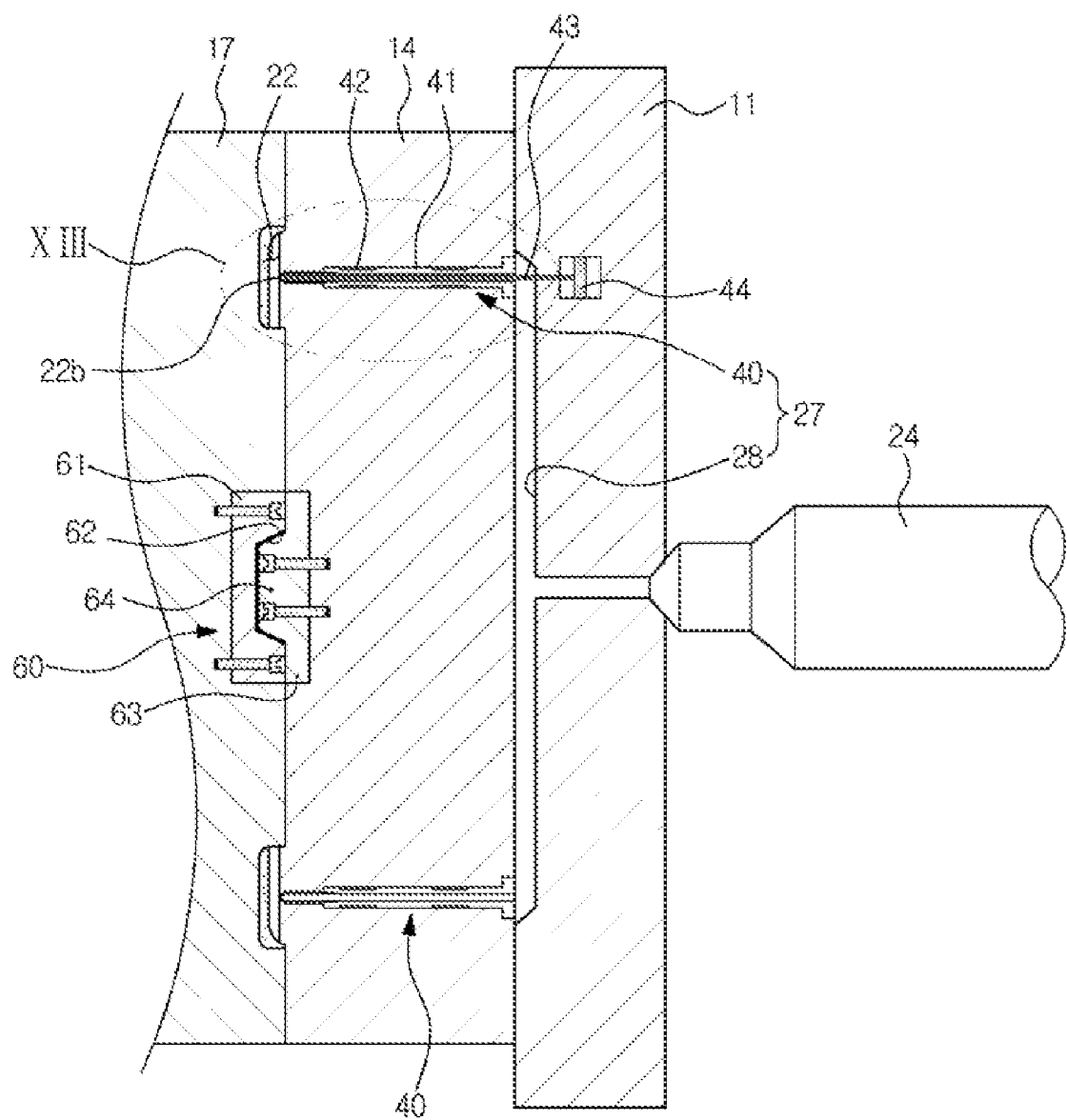
FIG. 11 is a sectional view illustrating a runner member of an injection molding machine according to an embodiment of the present general inventive concept.
Figure 12:
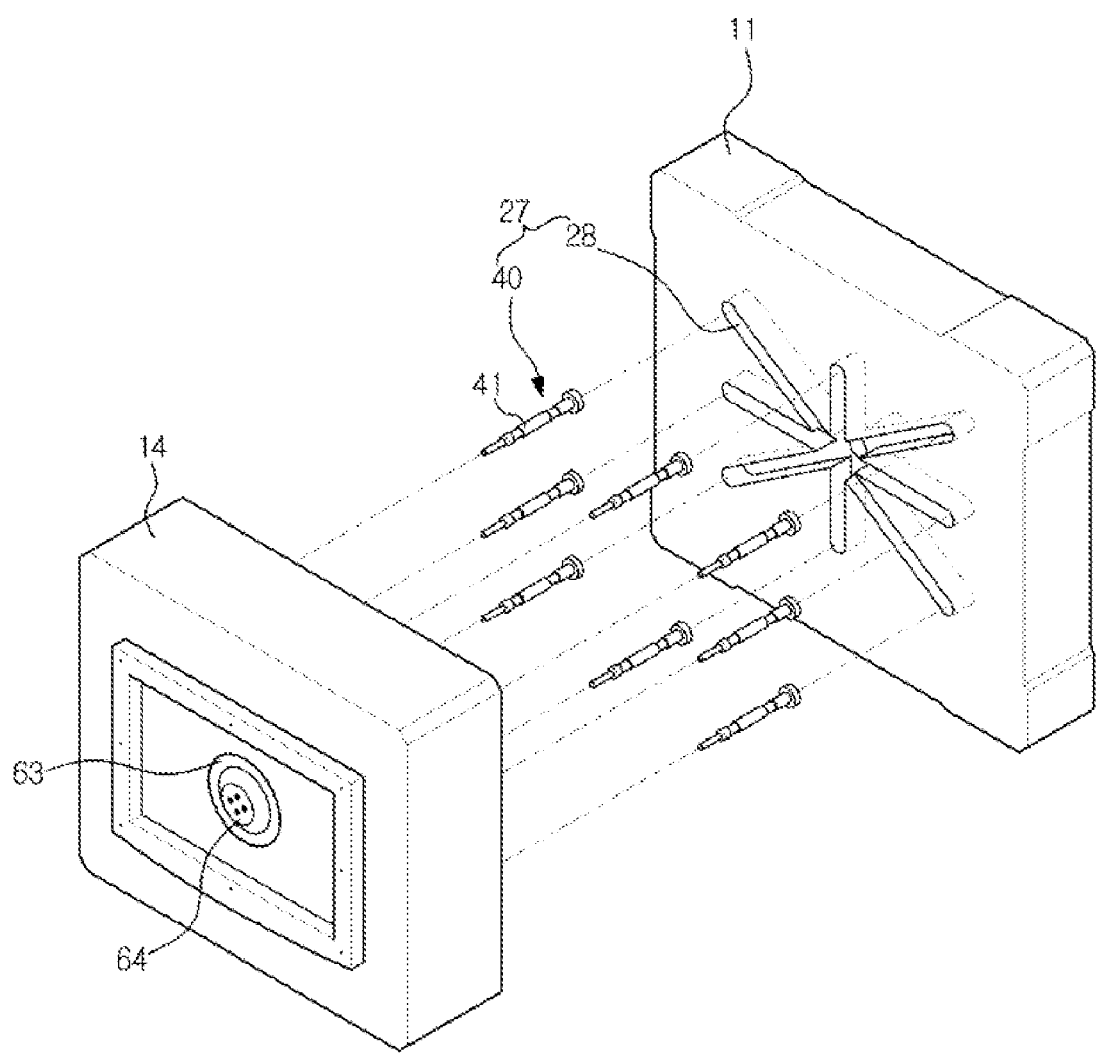
FIG. 12 is a perspective view illustrating a runner member of an injection molding machine according to an embodiment of the present general inventive concept.
Figure 13:
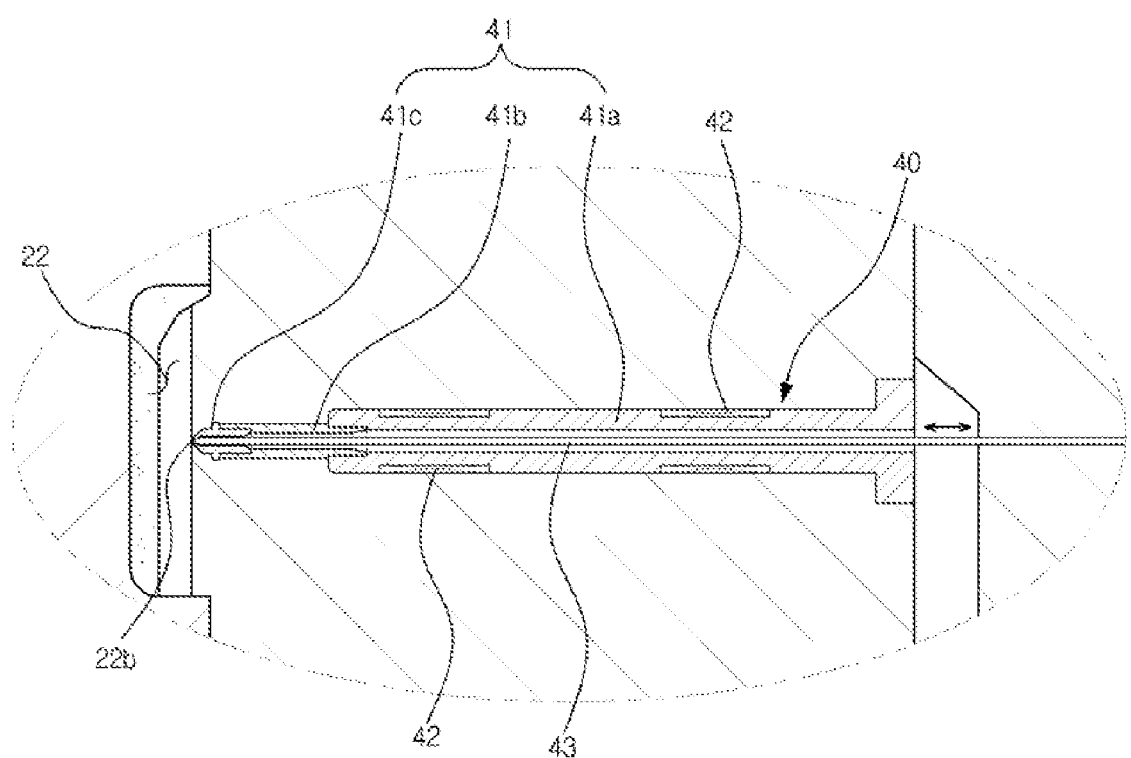
FIG. 13 is a detail view illustrating a XIII portion in FIG. 11.

A plurality of second runner members 40 mounted in the fixed mold 14 to supply the molten resin (colored resin) are as illustrated in FIGS. 11 to 13. The first runner members 30 mounted in the movable mold 15 substantially have a same shape as the second runner members 40 mounted in the fixed mold 14. Therefore, only the second runner members 40 will be explained hereinafter, in order to avoid duplication of explanation.

As illustrated in FIGS. 11 and 12, the second runner members 40 are arranged apart from each other so as to dispersively supply the molten resin supplied through a plurality of second dispersed injection channels 28 to a plurality of gates 22b (FIG. 13) of the second molding space 22. This is so that the molten resin is dispersively and evenly injected into the respective portions of the second molding space 22 and thereby the injection molding process can be smoothly achieved.

As illustrated in FIG. 13, each of the second runner members 40 includes a multi-stepped injection guide pipe 41 formed such that an inner diameter and an outer diameter are gradually decreased as they go from the second dispersed injection channel 28 to the gate 22b, a heater 42 mounted on the outer surface of the injection guide pipe 41 to heat the injection guide pipe 41, a pin 43 mounted in the injection guide pipe 41 to open or close the gate 22b, and a hydraulic cylinder 44 (refer to FIG. 11) mounted in the fixed mold 14 (FIG. 11) to move the pin 43 back and forth. The heater 42 heats the injection guide pipe 41 to regulate a temperature of the molten resin injected through the injection guide pipe 41. When the molten resin is injected, the pin 43 is moved back to open the gate 22b. After the molten resin is completely injected, the pin 43 is moved forth to close the gate 22b.

The multi-stepped injection guide pipe 41 includes a first injection guide pipe 41a having a relatively large inner diameter and a relatively large outer diameter, a second injection guide pipe 41b having inner and outer diameters smaller than the first injection guide pipe 41a and connected in series to the first injection guide pipe 41a, and a nozzle 41c connected to an outlet of the second injection guide pipe 41b to form the gate 22b. Because the respective elements of the injection guide pipe 41 are separately provided and then assembled with each other, the injection guide pipe 41 can be easily manufactured. Also, because the inner and outer diameters of the injection guide pipe 41 are gradually decreased as the injection guide pipe 41 extends toward to the gate 22b, the occupied space by the gate 22b is small. Accordingly, when the molds are fabricated, the position of the gate 22b can be easily set, and the molten resin can be accurately injected into the second molding space 22.

As apparent from the above description, the injection molding machine according to the present invention can minimize defects of a molded product by aligning centers of molds to be assembled with each other by virtue of the coupling guide device to guide the accurate coupling of the supporting plates and the molds.

Further, since a center guide device guides molds so as to align centers of the molds to be assembled with each other, an injection molding machine according to various embodiments of the present invention can minimize defects of a molded product.

Further, since a second coupling guide recess of a coupling guide device accepts thermal deformation of molds or supporting plates, the supporting plates and the molds can be mutually coupled to the correct positions. Accordingly, even when the thermal deformation of the molds occurs, assembling errors of the molds and the supporting plates can be minimized.

Although various embodiments of the present general inventive concept have been illustrated and described, it would be appreciated by those skilled in the art that changes may be made in this embodiment without departing from the principles and spirit of the general inventive concept, the scope of which is defined in the claims and their equivalents.

What is claimed is:

1. An injection molding machine, comprising:
    a movable supporting plate, fixed supporting plate and rotatable supporting plate;
    a movable mold, fixed mold and plurality of rotatable molds respectively coupled to the supporting plates; and
    a coupling guide device to guide the coupling of the molds and the supporting plates, the coupling guide device including a first coupling guide recess and a first coupling guide protrusion provided respectively at center portions of the rotatable supporting plate and the rotatable molds so as to be coupled to each other, and a second coupling guide recess and a second coupling guide protrusion provided respectively at the rotatable supporting plate and the rotatable molds, spaced apart from the first coupling guide recess and the first coupling guide protrusion, so as to be coupled to each other,
    wherein the second coupling guide recess is formed lengthwise in a direction toward a periphery from the center portions of the molds and the supporting plates.

2. The injection molding machine according to claim 1, wherein the second coupling guide recess and the second coupling guide protrusion have a T-shaped section with a T-shaped portion that protrudes from a surface of one of the molds.

3. An injection molding machine, comprising:
    a plurality of molds including a fixed mold, a movable mold, and two rotatable molds coupled to a plurality of supporting plates, the two rotatable molds being respectively united with the movable mold to form a first molding space and united with the fixed mold to form a second molding space such that the first and second molding spaces are disposed separate from a center portion of the plurality of molds;
    a plurality of runner members and nozzles disposed within the movable mold and the fixed mold to inject molten resin into the molding spaces; and
    a center guide device separate from the molding spaces and formed in the center portion of the plurality of molds to guide the molds so that centers of the molds coincide with each other when the molds are assembled with each other, the center guide device including a center guide recess formed at the center of one of the two molds, and a center guide protrusion provided at the center of the other one of the two molds.

4. The injection molding machine according to claim 3, wherein:
    the center guide recess has a tapered inner surface to guide insertion of the center guide protrusion; and
    the center guide protrusion has a tapered outer surface having a shape corresponding to the tapered inner surface of the center guide recess.

5. The injection molding machine according to claim 3, wherein:
    the center guide device includes a first guide plate and a second guide plate respectively removably coupled to the centers of the two molds, and
    the center guide recess is formed at the first guide plate, and the center guide protrusion is provided at the second guide plate.

6. The injection molding machine according to claim 3, wherein:
    the center guide recess is formed at one of the two molds, which has a relatively high temperature; and
    the center guide protrusion is provided at the other one of the two molds, which has a relatively low temperature.

7. An injection molding machine, comprising:
    a fixed supporting plate;
    a movable supporting plate spaced apart from the fixed supporting plate;
    a rotatable supporting plate rotatably and movably provided between the fixed supporting plate and the movable supporting plate;
    a fixed mold coupled to the fixed supporting plate;
    a movable mold coupled to the movable supporting plate;

two rotatable molds respectively coupled to both surfaces of the rotatable supporting plate, the two rotatable molds being united with the movable mold to form a first molding space external to a center portion of the two rotatable molds and the movable mold or being united with the fixed mold to form a second molding space external to a center portion of the two rotatable molds and the fixed mold; and a coupling guide device separate from the molding spaces to guide the coupling of the two rotatable molds and the rotatable supporting plate, the coupling guide device including a first coupling guide recess and a first coupling guide protrusion respectively provided at the center portions of the two rotatable molds and both the surfaces of the rotatable supporting plate so as to be coupled to each other, and a second coupling guide recess and a second coupling guide protrusion respectively provided at the two rotatable molds and both the surfaces of the rotatable supporting plate, spaced apart from the first coupling guide recess and the first coupling guide protrusion, so as to be coupled to each other, wherein the second coupling guide recess is formed lengthwise in a direction toward a periphery from the center portions of the two rotatable molds and the rotatable supporting plate.

8. The injection molding machine according to claim 7, wherein the second coupling guide recess and the second coupling guide protrusion have a T-shaped section.

9. The injection molding machine according to claim 7, further comprising:

a center guide device separate from the coupling guide device and the molding spaces to guide the fixed mold, the two rotatable molds and the movable mold so that the fixed mold can be united with the two rotatable molds and the movable mold can be united with the two rotatable molds while centers thereof coincide with each other, wherein the center guide device includes a center guide recess formed at the center of one of two molds opposing each other, and a center guide protrusion provided at the center of the other one of the two molds opposing each other, so as to be fitted into the center guide recess.

10. The injection molding machine according to claim 9, wherein:

the center guide recess has a tapered inner surface to guide insertion of the center guide protrusion; and the center guide protrusion has a tapered outer surface having a shape corresponding to the tapered inner surface of the center guide recess.

11. The injection molding machine according to claim 9, wherein:

the center guide device includes a first guide plate and a second guide plate respectively removably coupled to the centers of the two molds opposing each other; and the center guide recess is formed at the first guide plate, and the center guide protrusion is provided at the second guide plate.

12. The injection molding machine according to claim 9, wherein:

the center guide recess is formed at one of the two molds opposing each other, which has a relatively high temperature; and the center guide protrusion is provided at the other one of the two molds opposing each other, which has a relatively low temperature.

13. The injection molding machine according to claim 7, further comprising:

a plurality of runner members mounted in the fixed mold and the movable mold to form paths for molten resin supplied to the first molding space and the second molding space, wherein each of the plurality of runner members includes a multi-stepped injection guide pipe having an inner diameter and an outer diameter which are gradually decreased as they go to a gate, and a pin mounted in the injection guide pipe so as to be moved back and forth to open or close the gate.

14. The injection molding machine according to claim 13, wherein the injection guide pipe includes at least two pipes which have inner and outer diameters different from each other and are removably connected in series to each other.

15. An injection molding machine, comprising:

a fixed supporting plate;

a movable supporting plate spaced apart from the fixed supporting plate;

a rotatable supporting plate rotatably and movably provided between the fixed supporting plate and the movable supporting plate;

a fixed mold coupled to the fixed supporting plate;

a movable mold coupled to the movable supporting plate;

two rotatable molds respectively coupled to both surfaces of the rotatable supporting plate, the two rotatable molds being united with the movable mold to form a first molding space separate from a center portion of the two rotatable molds and the movable mold or being united with the fixed mold to form a second molding space separate from a center portion of the two rotatable molds and the fixed mold; and a center guide device separate from the molding spaces to guide the fixed mold, the two rotatable molds and the movable mold so that the fixed mold can be united with the two rotatable molds and the movable mold can be united with the two rotatable molds while centers thereof coincide with each other, wherein the center guide device includes a center guide recess formed at the center of one of two molds opposing each other, and a center guide protrusion provided at the center of the other one of the two molds opposing each other, so as to be fitted into the center guide recess.

16. The injection molding machine according to claim 15, wherein:

the center guide recess has a tapered inner surface to guide insertion of the center guide protrusion; and the center guide protrusion has a tapered outer surface having a shape corresponding to the tapered inner surface of the center guide recess.

17. The injection molding machine according to claim 15, wherein:

the center guide device includes a first guide plate and a second guide plate respectively removably coupled to the centers of the two molds opposing each other; and the center guide recess is formed at the first guide plate, and the center guide protrusion is provided at the second guide plate.

18. The injection molding machine according to claim 15, wherein:

the center guide recess is formed at one of the two molds opposing each other, which has a relatively high temperature; and the center guide protrusion is provided at the other one of the two molds opposing each other, which has a relatively low temperature.

19. The injection molding machine according to claim 15, further comprising:

a plurality of runner members mounted in the fixed mold and the movable mold to form paths for molten resin supplied to the first molding space and the second molding space, wherein each of the plurality of runner members includes a multi-stepped injection guide pipe having an inner diameter and an outer diameter which are gradually decreased as they go to a gate, and a pin mounted in the injection guide pipe so as to be moved back and forth to open or close the gate.

20. The injection molding machine according to claim 19, wherein the injection guide pipe comprises:

at least two pipes which have inner and outer diameters different from each other and are removably connected in series to each other.

21. An injection molding machine, comprising:

a rotatable supporting plate having two surfaces, a fixed mold, and a movable mold;

a plurality of rotatable molds respectively coupled to the two surfaces of the rotatable supporting plate to unite with at least one of the movable mold and the fixed mold; and a center guide device to guide the fixed mold, the plurality of rotatable molds and the movable mold, wherein the fixed mold unites with the plurality of rotatable molds to form a first molding space outside of a center portion of the rotatable molds and the fixed mold and the movable mold unites with the plurality of rotatable molds to form a second molding space outside of a center portion of the rotatable molds and the movable mold with centers of the fixed mold, plurality of rotatable molds and movable mold aligning with each other at the center portion.

22. An injection molding machine, comprising:

a movable supporting plate, fixed supporting plate and rotatable supporting plate;

a movable mold, fixed mold and plurality of rotatable molds respectively coupled to the supporting plates; and a coupling guide device to guide the coupling of the molds and the supporting plates, the coupling guide device including a first coupling guide recess and a first coupling guide protrusion provided respectively at center portions of the rotatable supporting plate and the rotatable molds so as to be coupled to each other, and a second coupling guide recess and a second coupling guide protrusion provided respectively at the rotatable supporting plate and the rotatable molds, spaced apart from the first coupling guide recess and the first coupling guide protrusion, so as to be coupled to each other, wherein the second coupling guide protrusion is provided movably relative to the second coupling guide recess so that when the molds or the supporting plates are deformed, the second coupling guide protrusion can move in a first direction or in a second direction opposite to the first direction in the second coupling guide recess.

23. The injection molding machine according to claim 22, wherein the second coupling guide protrusion is formed such that the second coupling guide protrusion can move in a longitudinal direction of the second coupling guide recess and is unable to move in a direction intersecting with the longitudinal direction of the second coupling guide recess.

24. The injection molding machine according to claim 23, wherein the second coupling guide protrusion and the second coupling guide recess have a T-shaped section with a T-shaped portion that protrudes from a surface of one of the molds.

25. The injection molding machine according to claim 22, wherein the first coupling guide recess and the first coupling guide protrusion are positioned at center portions of the molds and the supporting plates, and the second coupling guide recess is formed in a radial direction from the center portions of the molds and the supporting plates.

26. The injection molding machine according to claim 5, further comprising:

a plurality of bolts to respectively connect the second guide plate to the fixed mold and the first guide plate to one of the rotatable molds such that the plurality of bolts are fastened and disposed in the insertion direction of the center guide protrusion into the center guide recess.

* * * * *